United States Patent [19]
Bexten

[11] Patent Number: 5,724,699
[45] Date of Patent: Mar. 10, 1998

[54] WINDSHIELD WIPER ARM ASSEMBLY WITH FLUID TUBE

[75] Inventor: Daniel P. Bexten, Columbus, Miss.

[73] Assignee: United Technologies Motor Systems, Inc., Columbus, Miss.

[21] Appl. No.: 637,007

[22] Filed: Apr. 22, 1996

Related U.S. Application Data

[63] Continuation of Ser. No. 357,677, Dec. 16, 1994, abandoned.

[51] Int. Cl.$^6$ .................. B60S 1/46; B60S 1/32
[52] U.S. Cl. .................. 15/250.04; 15/250.351; 239/284.1
[58] Field of Search .............. 15/250.35, 250.01, 15/250.02, 250.03, 250.04, 250.2, 250.34, 250.31; 239/284.1, 284.2

[56] References Cited

U.S. PATENT DOCUMENTS

| | | | |
|---|---|---|---|
| 2,120,945 | 6/1938 | Sprankle | 15/250.35 |
| 2,191,423 | 2/1940 | Browne | 15/250.34 |
| 3,427,675 | 2/1969 | Tibbet | 15/250.04 |
| 3,670,354 | 6/1972 | Weber | 15/250.04 |
| 3,827,101 | 8/1974 | Wubbe | 15/250.04 |
| 4,133,071 | 1/1979 | Jaske | 15/250.04 |
| 5,398,370 | 3/1995 | Gorner | 15/250.04 |

FOREIGN PATENT DOCUMENTS

| | | | |
|---|---|---|---|
| 1295138 | 4/1962 | France | 15/250.04 |
| 1912037 | 9/1970 | Germany | 15/250.04 |
| 2425864 | 12/1975 | Germany | 15/250.04 |
| 838419 | 6/1968 | United Kingdom | 15/250.35 |
| 2151465 | 7/1985 | United Kingdom | 15/250.35 |

*Primary Examiner*—Gary K. Graham
*Attorney, Agent, or Firm*—William W. Habelt; Lloyd D. Doigan

[57] ABSTRACT

A wiper arm (30) for a vehicle windshield wiper assembly (14) has at least a section along its longitudinal extent formed of a longitudinally extending base portion (80) and two spaced side walls (82,84) extending outwardly along opposite sides of the base portion (80) to form an open channel (85). A spray nozzle (70) is disposed in the outboard portion of the wiper arm (30) and a fluid delivery tube (60) extends longitudinally along the wiper arm (30) to deliver wash fluid from a supply to the spray nozzle (70). The outboard edges (86,88) of the outwardly sidewalls (82,84) are folded inwardly towards each other to partially close the open face (87) of the channel (85), thereby retaining the fluid delivery tube (60), which is freely disposed, within the channel.

1 Claim, 2 Drawing Sheets

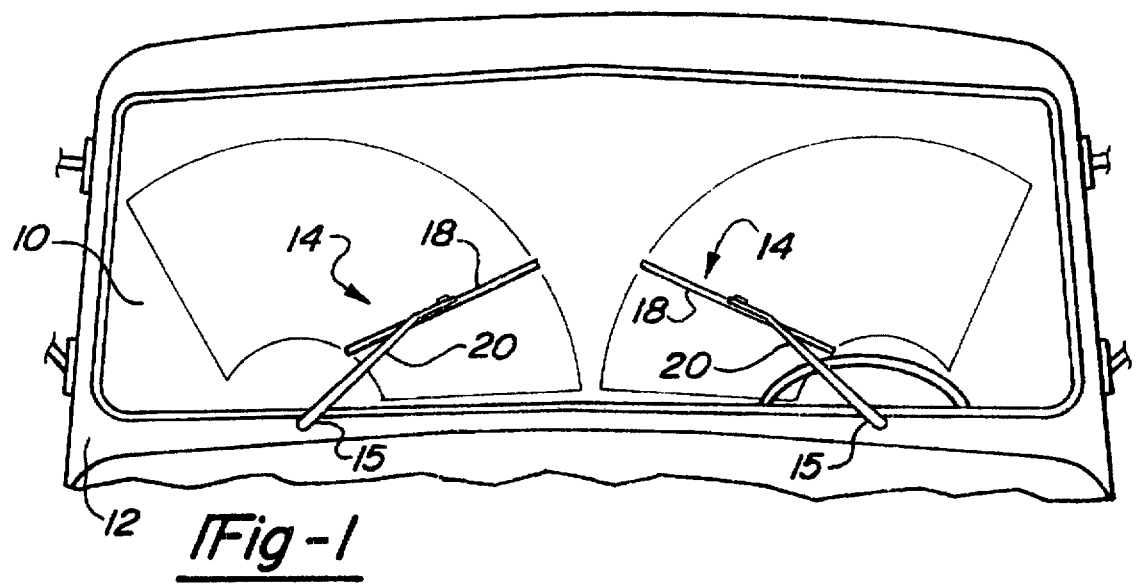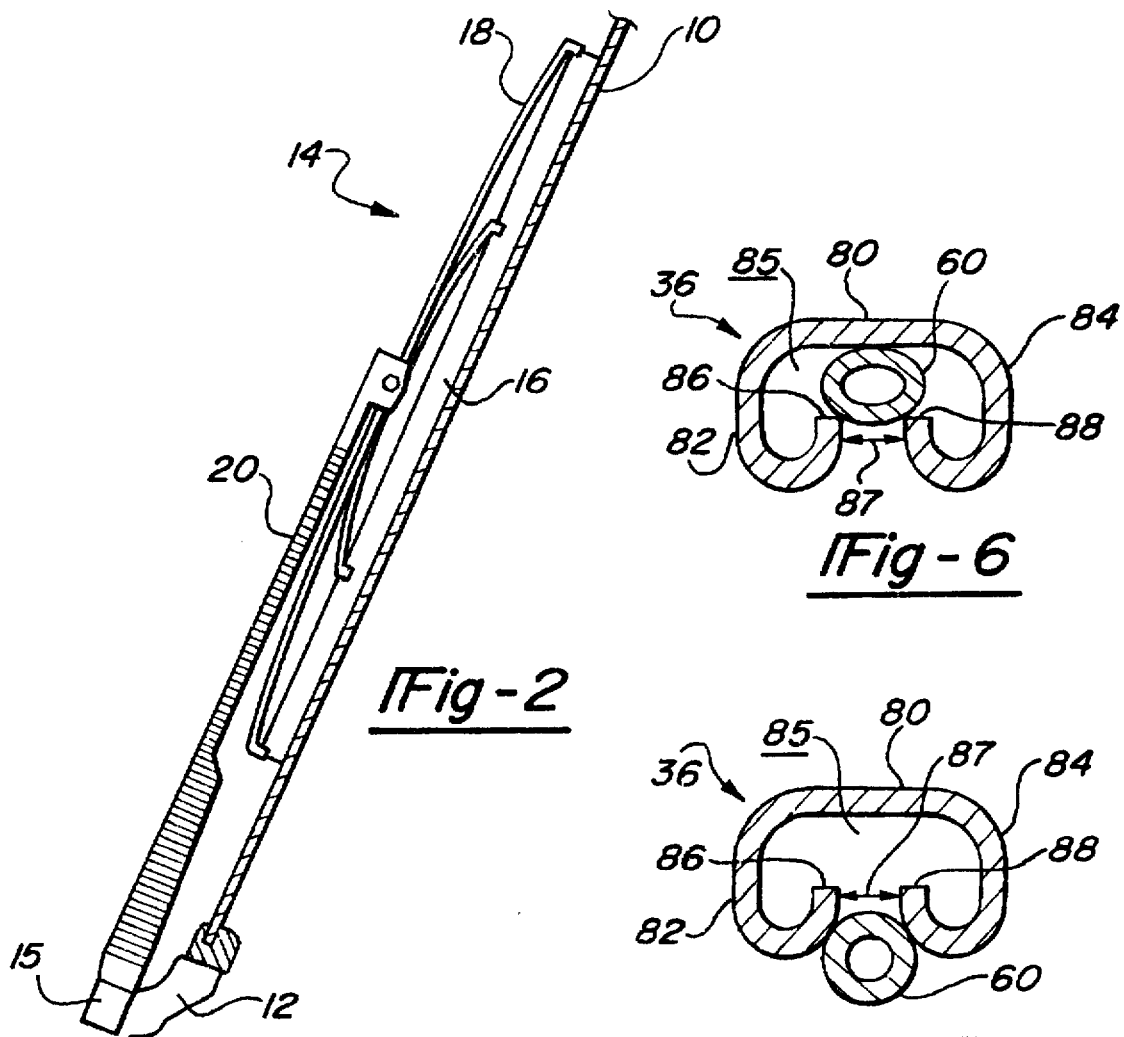

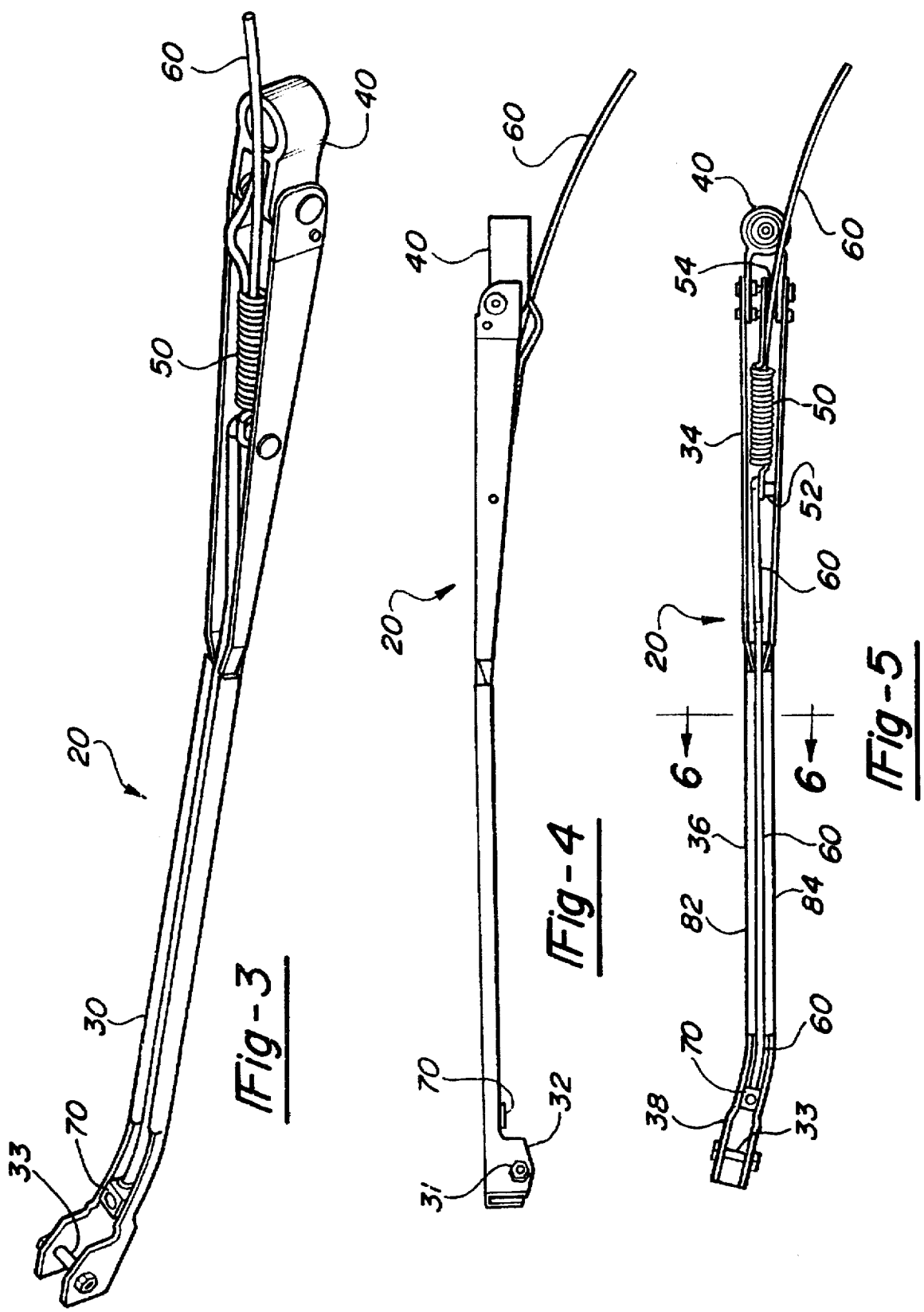

WINDSHIELD WIPER ARM ASSEMBLY WITH FLUID TUBE

This application is a continuation of application Ser. No. 08/357,677, filed Dec. 16, 1994, now abandoned.

BACKGROUND OF THE INVENTION

The present invention relates generally to vehicle windshield wiper assemblies, and more specifically to windshield wiper assemblies of the type wherein a liquid delivery conduit is disposed within the wiper arm and connected in fluid communication with a washer spray nozzle mounted adjacent the outboard free end of the wiper arm, such wiper assemblies being particularly useful on trucks and buses.

Numerous configurations of windshield wiper arms are commercially available for installation on vehicles today. One type of wiper arm is constructed of multiple open-channel sections that are pinned or otherwise secured together to provide an elongated member having an inboard end provided with means for mounting the wiper arm to a pivot shaft and an outboard free end provided with means for attaching a windshield wiper blade thereto. Another type of wiper arm is constructed and integrally formed from a single-piece, stamped blank of sheet metal which is bent to form an elongated member having an inboard end adapted to be mounted to a pivot shaft and comprising an elongated tapered, open-channel portion; an outboard end adapted for attaching a wiper blade thereon and also comprising an open-channel portion; and an intermediate portion comprising an elongated, substantially closed section of tubular cross-section. This intermediate tubular portion extends between and is integral with the channel shaped inboard and outboard end portions of the wiper arm. A one-piece wiper arm of this type is disclosed in U.S. Pat. No. 4,133,071.

In certain applications, such as for example on vehicles having large area windshields, such as for example trucks and buses, in order to facilitate washing of the windshield, it is necessary to provide a means for delivering wash liquid to a spray nozzle mounted to the wiper arm, typically adjacent the outboard end of the wiper arm. So located, the spray nozzle is positioned approximately at the center of the blade, and therefore wash liquid discharging from the spray nozzle will discharge into the central region of the wipe pattern of the blade. Thus, it has become common practice to include a liquid delivery conduit, typically a small diameter, flexible tube, in operative association with each wiper arm. Most commonly, the liquid delivery conduit is disposed within and extends along the wiper arm channel and is either attached thereto via clamps, clips or other securing means, or threaded through a substantially closed tubular portion of the wiper arm so as to be not only concealed and protected therein, but also retained therein without clamps, clips or like, as shown, for example, in the aforementioned U.S. Pat. No. 4,133,071.

SUMMARY OF THE INVENTION

It is an object of the present invention to provide a wiper arm assembly having a wiper arm which is adapted to facilitate installation and retention of a fluid delivery tube.

A wiper arm for a vehicle windshield wiper assembly is provided having at least a section along its longitudinal extent formed of a longitudinally extending base portion and two spaced side walls extending outwardly along opposite longitudinal sides of the base portion to form an open channel of generally U-shaped cross-section. In accordance with the present invention, the outboard edges of the outwardly sidewalls are folded inwardly towards each other to partially close the open face of the generally U-shaped channel section. In a particularly advantageous embodiment of the wiper arm of the present invention, the outboard edges of each of the outwardly extending sidewalls of the channel section are folded inwardly so as to curl back against itself.

BRIEF DESCRIPTION OF THE DRAWINGS

The present invention will be described in detail with respect to a preferred embodiment thereof with reference to drawings wherein:

FIG. 1 is a frontal elevational view of a windshield of a vehicle equipped with a windshield wiper assembly;

FIG. 2 is an enlarged side elevation sectional view of the windshield wiper assembly and windshield of FIG. 1;

FIG. 3 is a perspective view of a preferred embodiment of the windshield wiper arm assembly of the present invention;

FIG. 4 is a side elevational view of the windshield wiper arm assembly of FIG. 3;

FIG. 5 is a plan view looking at the face of the windshield wiper arm assembly of FIG. 3;

FIG. 6 is a cross-sectional view of the windshield wiper arm assembly of the present invention illustrating the liquid delivery tube in its installed position; and FIG. 7 is a cross-sectional view of the windshield wiper arm assembly of the present invention illustrating the fluid delivery tube in position to be installed.

DETAILED DESCRIPTION OF A PREFERRED EMBODIMENT

Referring now to FIGS. 1 and 2, there is depicted a typical windshield 10 mounted in a conventional manner on a vehicle 12, such as for example a truck or a bus. A pair of windshield wiper assemblies 14 are provided to sweep arcuate regions of the passenger and driver sides of the frontal area of the windshield 10. Each of the wiper assemblies 14 includes a blade 16 mounted in a conventional manner to blade mounting means 18 which is conventionally mounted, for example by a pivot pin, to the outboard free end of a wiper arm assembly 20. At its inboard end, the wiper arm assembly is mounted in a conventional manner to means, such as for example pivot head 40, for mounting the wiper arm assembly to a pivot shaft 15. In operation, the wiper blades 16 move in arcuate paths across their respective sweep regions of the windshield 10, as illustrated in FIG. 1, as the wiper arm assemblies 20 swing back and forth through a preselected arc as their respective pivot shafts are driven by a common motor or independent synchronized motors (not shown) as desired.

Referring now to FIGS. 3, 4 and 5, each wiper arm assembly 20 comprises a wiper arm 30, a pivot head 40, a coil spring 50, a fluid delivery tube 60, and a spray head 70. The wiper arm 30 comprises a longitudinally extending member having an inboard portion 34, an outboard portion 38 and an intermediate portion 36 extending longitudinally between the inboard portion 34 and the outboard portion 38. The inboard portion 34 and the Outboard portion 38 of the wiper arm 30 are formed as substantially open channels of U-shaped cross-section. The inboard end of the inboard portion 34 of the wiper arm 30 is mounted to the pivot head 40 such as, for example, by means of a pin, rivet, bolt or other suitable fastener in a conventional manner. The pivot head 40 is mounted in a conventional manner to the pivot shaft 15 which is driven by the wiper motor (not shown) so as to pivot back and forth through a preselected angular range.

The outboard end of the outboard portion 38 of the wiper arm 30 is formed in a U-shaped configuration with tab portions 32 having apertures 31 therein for receiving a pivot member 33, such as a pin or a bolt, to support the wiper blade 16. Spring 50 is disposed within the inboard portion 34, being mounted at one end to anchor pin 52 and at its other end to anchor pin 54, each of which pins extend transversely between and are secured to the sidewalls of the inboard portion 34 of the wiper arm 30. The coil spring 50 serves to urge the wiper blade 16 carried by the wiper arm assembly 20 against the windshield 10.

In order to facilitate washing of the windshield 10, a spray head 70 is mounted within the outboard portion 38 of the wiper arm 30, positioned inboard of the tab portions 32. The spray head 70 is so positioned in order to ensure that wash fluid is sprayed in the central region of the sweep region of the blade mounted to its respective wiper arm assembly. The fluid delivery tube 60 provides a conduit through which wash fluid is supplied from a reservoir (not shown) to the spray head 70. The fluid delivery tube 60 is passed through the open central portion of the coil spring 50 and thence along the intermediate portion 36 and the outboard portion 38 of wiper arm 30 to the spray head 70.

The intermediate portion 36, which advantageously forms at least a substantial portion of the longitudinal extent of the wiper arm 30, is formed of a longitudinally extending base portion 80 and a pair of spaced side walls 82, 84 extending outwardly along opposite longitudinal sides of the base portion 80 to form an open channel 85 of generally U-shaped cross-section. In accordance with the present invention, the outboard edges 86 and 88 of the outwardly extending sidewalls 82 and 84, respectively, are folded inwardly towards each other to partially close the open face of the generally U-shaped channel section 85 thereby reducing the cross-width of the open face 87 of the channel section 85. In a particularly advantageous embodiment of the wiper arm 30 of the present invention, the outboard edges 86 and 88 of each of the outwardly extending sidewalls 82 and 84 of the channel section 85 are folded inwardly so as to curl back against themselves, as illustrated in FIGS. 6 and 7. Most advantageously, the cross-width of the open face 87 of the channel section 85 is reduced so as to be approximately equal to, but less than, the nominal outside diameter of the fluid delivery tube 60.

As illustrated in FIG. 6, the fluid delivery tube 60 is securely retained and protected within the channel section 85. The fluid delivery tube 60 is prevented from falling out of the channel section 85 because of the restricted width of the open face 87 between the inwardly directed end portions 86 and 88, respectively, of the sidewalls 82 and 84. The fluid delivery tube 60 is easily and quickly installed within the channel section 85 by aligning the fluid delivery tube 60, which typically comprises a flexible tube, such as for example a tube made of neoprene rubber or plastic, with the open face 87 of the channel section 85 and then gently pushing the tube 60 forwardly through the open face 87. Because of the flexibility of the fluid delivery tube 60, it readily deforms cross-sectionally under the forward force applied by the installer and slips through the open face 87 into the channel section 85 whereupon the cross-section of the tube 60 returns approximately to its original shape, that is approximately to its original circular cross-section, but it may remain somewhat oval in cross-section.

I claim:

1. A windshield wiper arm supporting a wiper blade, said arm comprising:

an elongated flexible fluid delivery tube having a given diameter, and a longitudinally elongated member having:
an inboard end portion,
an outboard end portion, and
an intermediate portion extending longitudinally between said inboard end portion and said outboard end portion, said intermediate portion having a longitudinally extending base, said base having a pair of side edges and a pair of first bends, each bend defining a side wall relative to and extending from said base, each wall having a second bend such that an end region of each wall extends toward the base and wherein each end region has an edge that faces the base said end regions defining a reduced width opening to a channel defined between said walls, said opening having a width less than said diameter of said tube, said width being sufficient to allow said flexible tube to be inserted through said opening into said channel with non-destructive deformation of the tube and to retain said tube in said channel.

* * * * *